United States Patent [19]

Goins et al.

[11] Patent Number: 4,858,201
[45] Date of Patent: Aug. 15, 1989

[54] METHOD FOR ESTIMATING SHEAR WAVE REFLECTION DATA FROM ACQUIRED COMPRESSIONAL WAVE REFLECTION DATA

[75] Inventors: Neal R. Goins, Rocky Hill, N.J.; Ray S. Spratt, Lancaster, Calif.

[73] Assignee: Mobil Oil Corporation, New York, N.Y.

[21] Appl. No.: 99,446

[22] Filed: Sep. 21, 1987

Related U.S. Application Data

[63] Continuation-in-part of Ser. No. 41,964, Apr. 24, 1987, Pat. No. 4,736,349.

[51] Int. Cl.$^4$ .............................................. G01V 1/36
[52] U.S. Cl. ....................................... 367/75; 367/47; 364/421
[58] Field of Search ..................... 367/47, 50, 51, 52, 367/56, 75; 364/421

[56] References Cited

U.S. PATENT DOCUMENTS

4,534,019 8/1985 Wiggins et al. ...................... 367/75

OTHER PUBLICATIONS

"A Case Study of Stratigraphic Interpretation Using Shear and Compressional Data", Geophysics, vol. 49, No. 5, May 1984, pp. 509–520.
"Rock Lithology and Porosity Determination from Shear and Compressional Wave Velocity"; Geophysics, vol. 49, No. 8; Aug. 1984; pp. 1188–1195.
"Change in Reflectivity with Offset Research Workshop"; Geophysics, vol. 49, No. 6; pp. 838–839.
"Plane-Wave Reflection Coefficients for Gas Sands at Nonnormal Angles of Incidence"; Geophysics, vol. 49, No. 10, Oct. 1984; pp. 1637–1648.
"A Simplification for the Zoeppritz Equations"; Geophysics, vol. 50, No. 4, Apr. 1985; pp. 609–614.
"Direct Hydrocarbon Detection Using Comparative P-Wave and S-Wave Seismic Sections"; Geophysics, vol. 50, No. 3, Mar. 1985; pp. 383–393.
"Amplitude-Versus-Offset Analysis"; Litton-Western Geophysical; pp. 1–8.
G. S. Gassaway, "Effects of Shallow Reflectors on Amplitude Versus Offset (Seismic Lithology) Analysis", SEG Expanded Abstracts, pp. 665–669, 1984.
Hilterman, "Course in Seismic Lithology", 1983.

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

An improved method is disclosed for obtaining shear wave data from common depth point gathered compressional wave traces using variations in the amplitude of the gathered compressional waves with source receiver offset. The shear wave data is determined from measured compressional amplitude offset values and incident angles of shear wave data. The incident angles are determined from the offsets and smoothed interval velocity functions.

6 Claims, 14 Drawing Sheets

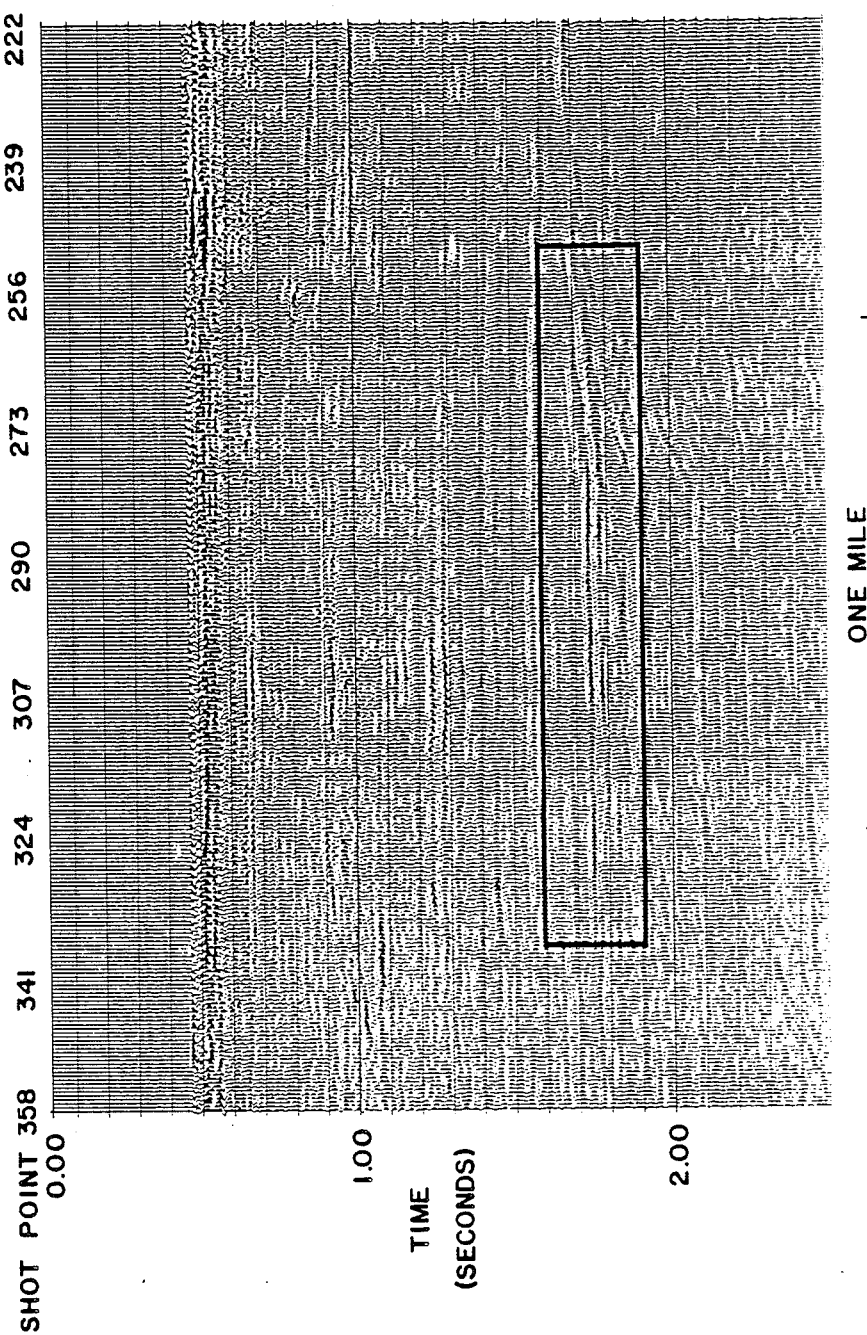

METHOD FOR ESTIMATING SHEAR WAVE REFLECTION DATA FROM ACQUIRED COMPRESSIONAL WAVE REFLECTION DATA

RELATED APPLICATIONS

This application is a continuation-in-part of U.S. patent application Ser. No. 041,964, now U.S. Pat. No. 4,736,349 filed Apr. 24, 1987.

This application is related to U.S. patent application Ser. Nos. 099,178 and 099,451 filed simultaneously with this application.

BACKGROUND OF THE INVENTION

1. Field of the Invention

The present invention relates to a method for estimating shear wave reflection data and, more particularly, to a method for producing pseudoshear wave reflection seismic sections from compressional wave reflection data.

2. Discussion of the Prior Art

The use of compressional, or P, wave reflection data in geophysics analysis is notoriously well known. Typically, seismic sections are produced from compressional wave subsurface reflections which provide extremely useful information concerning formation characteristics. Recently, interest has been growing in obtaining shear, or S, wave seismic sections which would provide additional useful information concerning subsurface formation characteristics which can be used in conjunction with information obtained from compressional wave seismic sections. For example, compressional wave seismic sections can provide useful information on the compressibility of subsurface formations, while shear wave seismic sections can provide useful information on subsurface formation rigidity. Shear wave seismic reflections are noisier than compressional wave seismic reflections, however, making interpretation difficult. Furthermore, the detection of shear wave reflections is more difficult than is the case with compressional wave reflections. The shear wave reflections are typically of much lower amplitude than compressional wave reflections, making detection difficult, and the direct propagation of a shear wave into a subsurface formation to induce a shear wave reflection require special transducers and additional steps over and above those required for obtaining compressional wave reflection data. This makes obtaining shear wave reflection data difficult, more costly and time-consuming.

It has long been recognized that compressional wave reflectivity is a function of incident angle. This behavior is described by the Zoeppritz equations. The Zoeppritz equations include a shear wave velocity information. While shear wave data may be estimated from conventional data by extracting such shear wave data from amplitude-offset data, in order to obtain a valid estimate of the shear reflectivity from real seismic data, it is necessary to consider a variety of other effects. For example, spherical spreading, attenuation, arrays and directivity all cause amplitude to vary with offset. Small errors in move-out velocity and statics can completely overwhelm the amplitude-offset signal.

While difficult to obtain, shear wave data can be very useful in the exploration for hydrocarbons. Hydrocarbon deposits which produce compressional wave reflection amplitude anomalies do not produce similar shear wave reflection amplitude anomalies. Such a result occurs because shear waves do not respond to any fluids and therefore do not produce different amplitude responses for gas, oil, and water. In contrast, compressional wave amplitude anomalies that are caused by anomalous lithologies such as salt, coal and hard streaks usually have equally anomalous shear wave behavior. Such an application of shear wave information has not been widely exploited, however, because most amplitude anomalies of interest occur offshore while shear wave seismic data can only be recorded onshore.

Efforts to apply shear wave information to provide useful data have been ongoing for several years. The article entitled "Rock Lithology and Porosity Determination from Shear Compressional Wave Velocity" by S. Domenico and published in 1984 in the journal Geophysics vol. 49, no. 8, and the article entitled "A Case Study of Stratigraphic Interpretation using Shear Compressional Seismic Data" by M. McCormick et al published in 1984 in the journal Geophysics, vol. 49, no. 5, focused on the $V_p/V_s$ ratio as a useful diagnostic for lithology and porosity. However, in many situations, $V_p$ and $V_s$ are highly correlated. Thus, to extract useful information about perspective formations from shear data, it is necessary to measure relatively small changes in $V_p/V_s$ in relatively thin intervals. Such techniques have proven difficult to accomplish with current shear wave technology.

However, there is one situation where $V_s$ behaves quite differently than $V_p$. Such a situation occurs in those parts of the earth's subsurface where the rock properties are strongly influenced by the presence of gas in the pore space. When the pore fluid in a porous rock changes from brine to gas moving updip along a trap, $V_p$ generally decreases. In high-porosity, weakly-consolidated rocks, the decrease in $V_p$ is large and gives rise to observable, lateral changes in reflectivity and hydrocarbon indicators. In contrast, the pore fluid change causes only a small change in $V_s$, resulting in negligile lateral changes in reflectivity. Thus, while a hydrocarbon indicator should stand out on the compressional wave seismic section as an amplitude anomaly, there should be little, if any, amplitude anomaly on the corresponding shear wave seismic section. If the compressional wave amplitude anomaly is caused by an anomalous lithology such as salt or coal, it should be equally apparent on the shear wave section. Thus, the best potential application of the shear wave should be distinguishing between true (hydrocarbon) and false (lithologic) amplitude anomalies.

One problem, however, with utilizing such comparative analysis methods is that the compressional and shear wave seismic sections must pertain, without ambiguity, to the same reflection point. Such a problem is solved by the pseudoshear method. Another problem associated with such method is that while a hydrocarbon indicator should produce an amplitude anomaly on the shear wave seismic section, limitations on the dynamic range of displays of such seismic data make it difficult to assess amplitude differences between compressional and shear wave seismic sections. Such a result is particularly common when the hydrocarbon formations producing amplitude anomalies are gas deposits in young, poorly consolidated formations where amplitude differences between compressional and shear wave data are difficult to assess.

An additional problem which is associated with methods for estimating shear wave reflection data from compressional wave amplitude offset variations is that such estimates, hereafter referred to as pseudoshear estimates, are extremely sensitive to small errors in NMO velocity. Pseudoshear values are derived by measuring amplitude behavior of the P-wave data across timing lines in an NMO corrected CDP gather. Correcting for time or velocity so that nearly perfect time alignments are produced from trace to trace for every reflector in the CDP gather is required to prevent the introduction of velocity errors. However, regardless of the care taken in determining stacking velocities when performing NMO corrections, typical NMO correction methods tend to leave some residual moveout in the seismic data which introduces errors in pseudoshear estimates later produced.

SUMMARY OF THE INVENTION

One object of the present invention is the provision of a method for estimating shear wave reflection data from acquired compressional wave reflection data to thus remove the requirement for a "shooting" or other special data acquisition procedures to obtain shear wave reflection data.

Another object of this invention is to provide for a method for producing pseudoshear wave seismic sections from acquired compressional wave reflection data. The pseudoshear seismic sections, which is estimated from prestack compressional wave data, is correlated in space and time to the compressional wave seismic data. Pseudo shear values are derved by measuring amplitude behavior of the P-wave data across timing lines in an NMO corrected CDP gather.

The method of the invention analyzes variations in the amplitude of recorded compressional wave traces with source-receiver offset. Many variables affect the amplitude of the compressional wave signal with offset, including the presence of a shear waves at a reflection boundary. Each of the factors affecting amplitude is quantified and assigned a value, either estimated or measured, allowing the effects of shear wave reflections on the amplitude changes with offset to be estimated and recorded, thus producing shear wave reflection data. Seismic sections based upon the estimated shear wave reflection data can then also be produced.

The above and other objects, advantages and features of the invention will be more readily understood from the following detailed description of the invention, which is provided in connection with the accompanying drawings.

BRIEF DESCRIPTION OF THE DRAWINGS

FIG. 5 illustrates a compressional wave seismic section acquired by the methods of FIGS. 1 and 2;

DETAILED DESCRIPTION OF THE INVENTION

Figure 1:
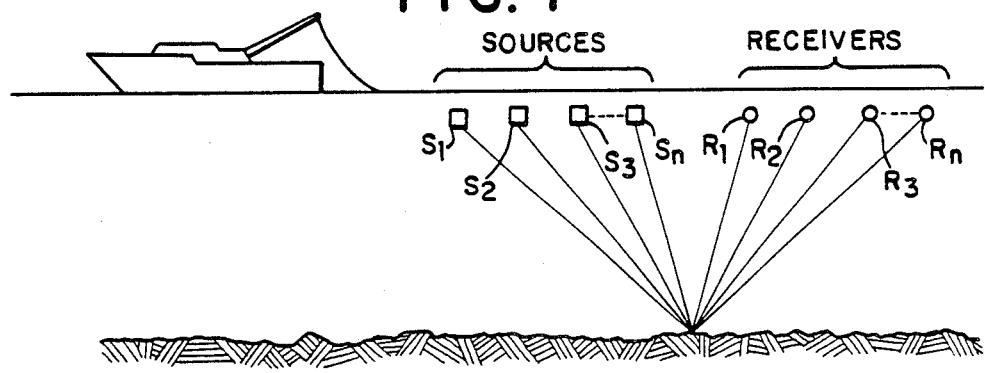
FIG. 1 illustrates a marine seismic exploration system employing an array of sources and receivers.

FIG. 1 illustrates source and receiver arrays which are typically used in marine seismic surveying. It should be understood that similar arrays are used for land seismic surveying and that the present invention is applicable to data gathered in both types of surveying. When land surveying is employed, however, an additional static correction is used, as discussed below, which is not needed in a marine environment.

Figure 2:
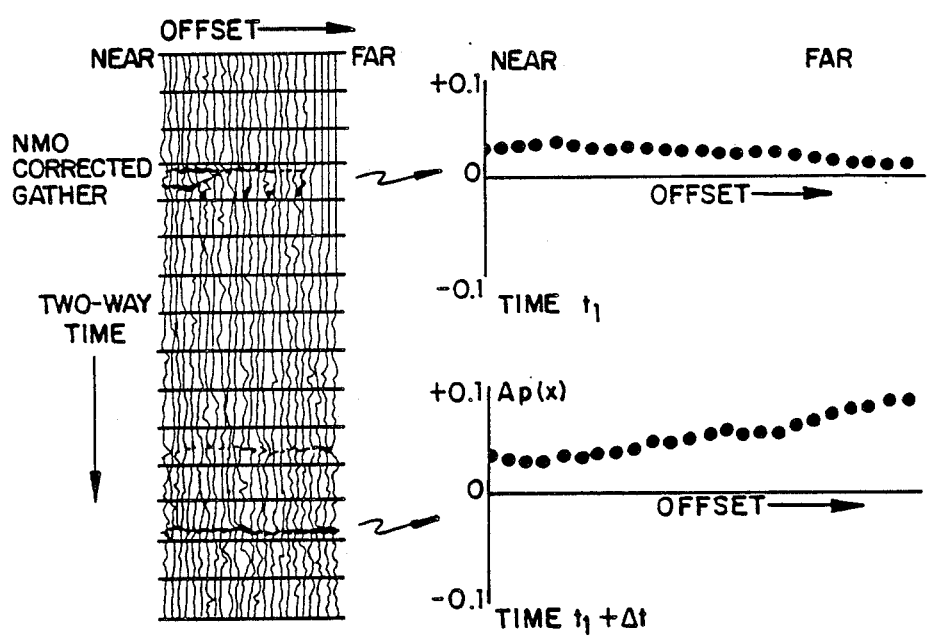
FIG. 2 illustrates a CDP gather of compressional reflection wave traces and graphs showing trace amplitude variations with offset.

During data gathering, the sources $S_1 \ldots S_n$ are activated, typically in sequence, to generate descending acoustic waves which partially reflect off surface boundary layers, producing ascending reflection signals (traces) which are received by receivers $R_1 \ldots R_n$ and recorded. During subsequent processing to produce seismic sections, the recorded signals are often gathered for common depth point (CDP) stacking. A typical common depth point gather is shown in FIG. 2 for near and far coupled pairs of sources and receivers, as well as for paired sources and receivers in between. The signals in this gather have been preprocessed by application of normal move out (NMO) corrections in a known manner to the gathered signals. If a land shooting is involved, the recorded signals in the FIG. 2 gather have also been preprocessed for surface consistent static. Both NMO corrections and surface consistent static corrections are well-known in the art and a detailed discussion of these techniques is not repeated herein. Normally, the signal gather in FIG. 2 is then CDP stacked to enhance the signal-to-noise ratio of the reflection signals and the stacked traces may then be used to produce seismic sections of compressional reflection wave data.

The method of the invention uses variations in the amplitude of the CDP gathered compressional waves with offset, denoted herein as $A_p(x)$, at selected points in time to estimate shear wave reflection data, which can in turn be used to produce pseudoshear wave seismic sections corresponding to CDP stacked compressional wave seismic sections. As known in the art, offset refers to the distance between source receiver pairs used to generate a signal trace. The amplitude variation with offset $A_p(x)$ for the gathered traces at two selected points in time $t_1$, $t_1 + \Delta t$, is also shown in FIG. 2.

To understand the method of the invention, a brief discussion of the factors affecting amplitude variations with offset $A_p(x)$ is necessary. These are the P wave reflection coefficient $R_p$ (the coefficient of reflection of the compressional wave at a reflection interface), travel path factors (acoustic wave spreading and transmission characteristics), geometric characteristics of the source-receiver arrays and surface boundary conditions, and random variations such as transducer coupling (mainly for geophones in a land based shooting), and shallow attenuation. Of these factors, proper choice of shooting conditions can minimize the effects of most factors (except $R_p$) on the value $A_p(x)$. However, all of these factors, save $R_p$, cannot be completely removed and will be compensated for in processing the invention, the various factors affecting the value $A_p(x)$ are quantified so that the effects of changes in $A_p(x)$ due to shear wave reflections can be determined to provide information on the magnitude of the shear wave reflections.

The reflection coefficient $R_p$ is one of the most important factors which must be determined in the method of the invention. The well-known Zoeppritz equation relates the reflection coefficient $R_p$ to the variables $-\rho$, $V_p$, $V_s$, $-\rho'$, $V_p'$, $V_s'$, where $-\rho$, $V_p$ and $V_s$ are the density, compressional wave velocity and shear wave velocity in the upper medium at a formation interface and $-\rho$, $V_p'$, and $V_s'$ are the density, compressional wave velocity and shear wave velocity in the lower medium at the interface.

Certain assumptions may be made concerning the relationships of these factors in the Zoeppritz equation. First, the fractional velocity/density changes across a reflection boundary are small and second, that the incident angles $\theta$ between source and receiver pairs are small. Typically, angles up to 22° from the normal for the sources and receivers can be used in the gathered traces to ensure that the second assumption is accurate. With these simplifying assumptions, the Zoeppritz power series equation can be expanded into its components, with the second order of terms dropped, yielding the following simplification:

$$R_p(\theta) \approx P + Q \sin^2 \theta \quad (1)$$

$$P = R_{po} \quad (2)$$

$$Q = R_{po} - 8T^2 R_{so} + (2T^2 - \tfrac{1}{2})\Delta\rho/\rho \quad (3)$$

where:

$$\Delta\rho = \rho - \rho';$$

$\theta$ is the angle from the normal of the wave path between a source-receiver pair; and, $$T = \text{Average of } V_s/V_p \quad (4)$$

$R_{po}$ is the normal incident P wave reflection coefficient; and $R_{so}$ is the normal incident S wave reflection coefficient ($R_{po}$ and $R_{so}$ are the coefficients which exists for P and S waves propagated normal to a reflection boundary).

For the first order factors discussed above, e.g. travel path factors, geometric characteristics, random variations, etc., which have not been removed from the gathered signals by appropriate selection of shooting conditions and preprocessing and which still affect the amplitude variation with offset $A_p(x)$, each can be represented by a function $$F_i \sim 1 + g_i \sin^2 \theta \quad (5)$$

where:

$i = 1$ to the number of influencing factors N.

Thus, the total of all remaining influencing effects can then be represented as:

$$A_p(\theta) \approx (F_1 \cdot F_2 \ldots \cdot F_n) R_p(\theta) \quad (6)$$

The value $A_p(\theta)$ can also be represented by a general equation of the form:

$$A_p(\theta) = P + Q \sin^2 \theta \quad (7)$$

with:

$$P = R_{po} \quad (8)$$

and:

$$Q = GR_{po} - 8T^2 R_{so} + (2T^2 - \tfrac{1}{2})\Delta\rho/\rho \quad (9)$$

where $G = N\Sigma_i g_i$ \quad (10)

Equation (10) represents the totality of amplitude effects in the gathered traces caused by the various influencing factors discussed above, e.g. travel path factors, geometric characteristics, random variations, etc. which have not been removed from the gathered traces by shooting conditions or pre-processing.

For recorded traces at known offsets, equation (7) can be rewritten as:

$$A_p(x) \sim P + Q f x^2 \quad (11)$$

where:

x represents known offset values determined by the spatial positioning of sources and receivers in the array (FIG. 1), $A_p(x)$ is measured amplitude value for a determined offset x, and f represents a conversion factor for offset to incident angle derived from NMO corrections $$f = (V_{INT}/tV_{st}) \quad (12)$$

where $V_{INT}$ is an estimated interval velocity (P wave velocity through a medium of interest), $V_{st}$ is an estimated stacking velocity (effective velocity used to line up traces in a stack), and t is a two-way travel time.

Equation (11) can be solved for P and Q at each selected time point using, for example, an iterative least mean squared procedure to find the best "fit" of P and Q values. From calculated P and Q values, equation (8) can be solved to yield $R_{po}$ values. Moreover, the determined value of Q can be used in equations (9) to determine $R_{so}$ (the normal shear wave reflection coefficient) if the values of T, G, and $\Delta\rho/\rho$ are known. The relationship of the value T (equation 4) to Q can be illustrated as follows:

| $T = \dfrac{Q}{V_p/V_s}$ | Q |
|---|---|
| 1.4 | $GR_{po} - 4 R_{so} + \tfrac{1}{4} \Delta\rho/\rho$ |
| 2.0 | $GR_{po} - 2 R_{so}$ |
| 4.0 | $GR_{po} - \tfrac{1}{2} R_{so} - \tfrac{3}{8} \Delta\rho/\rho$ |

As demonstrated, if $T=V_p/V_s=2.0$, then the term $\Delta\rho/\rho$ is eliminated as a factor in the calculation of Q. In many instances, the value of T will indeed be 2.0. However, it is also now possible to obtain direct measurements of $V_p/V_s$ using compressional and shear wave borehole logs, enabling the value $R_{so}$ to be determined from determined values of T, Q, and $R_{po}$, if $\Delta\rho/\rho$ and G can also be determined.

The value $\Delta\rho/\rho$ can often be predicted with reasonable accuracy from known subsurface characteristics. Typically, $\Delta\rho/\rho \sim 1/nR_{po}$, where n is an observed value for a particular area and is typically 5. It is also possible to obtain $\Delta\rho/\rho$ directly as a measured value from actual well logs of a surveyed area ($\Delta\rho/\rho=V_p/V_p$).

The value of G can be estimated, as it typically has the value $G\sim 0$ when land vibrator velocity geophones are used in the source-receiver array. It also typically has the value $G\sim 1$ for marine explosive and hydrophone sources and hydrophone receivers. However, it is also possible to more accurately estimate the value of G. A description of a technique for doing this is as follows:

Recalling equations (8) and (9), $$P=R_{po} \tag{8}$$

$$Q=GR_{po}-8T^2R_{so}=(2T^2-\tfrac{1}{2})\Delta\rho/\rho \tag{9}$$

P and Q are estimated using, for example, a least mean squared technique, for each time point in the CDP trace gather. The density term $\Delta\rho/\rho$ in equation (9) can be removed by assuming $\Delta\rho/\rho\sim 1/n(R_{po})$. Equation 9 then reduces to:

$$Q = G + \left(\frac{(2T^2-\tfrac{1}{2})}{nR_{po}}\right)8T^2R_{so} \tag{13}$$

In simplifying the Zoeppritz equation initially, it was assumed that T and G are slowly varying functions of time (and, of course, depth). Accordingly, a smoothing or low-pass filtered version of their constituent parts is all that is needed to estimate their values. This can be obtained from P wave and S wave log data from boreholes in the near vicinity. Thus, if P and S wave velocities ($V'_p$, $V'_s$) are taken from corresponding logs, the function T can be estimated as $$T \approx <\frac{V_s}{V_p}> \tag{14}$$

where: $<\ >$ designates a low pass filtering operation.

Next, if synthetic P and S wave reflectives $R'_{po}$ and $R'_{so}$ are derived from P and S wave logs, then combining equations (8) and (9) and low pass filtering provides the following estimate of the function G:

$$G \approx \left(<\frac{PQ}{P^2}>\right) + 8T^2\left(\frac{R'_{po}R'_{so}}{R'^2_{po}}\right) - \left(\frac{2T^2-\tfrac{1}{2}}{n}\right) \tag{15}$$

Once the value of G is known, equation (9) can be solved for $R_{so}$.

$$R_{so}=(1/n(G+2T^2-\tfrac{1}{2})P-Q)/8T^2 \tag{16}$$

Thus, by first solving equation (7) using an iterative procedure to determine P (where $P=R_{po}$) and Q and then solving equation (9) to determine $R_{so}$, both the compressional wave reflection coefficient $R_{po}$ and the shear wave reflection coefficient $R_{so}$ can be determined from measured amplitude variations with offset $A_p(x)$. These values can be used to construct both compressional wave and shear wave seismic sections for interpretation and analysis.

Figure 3:
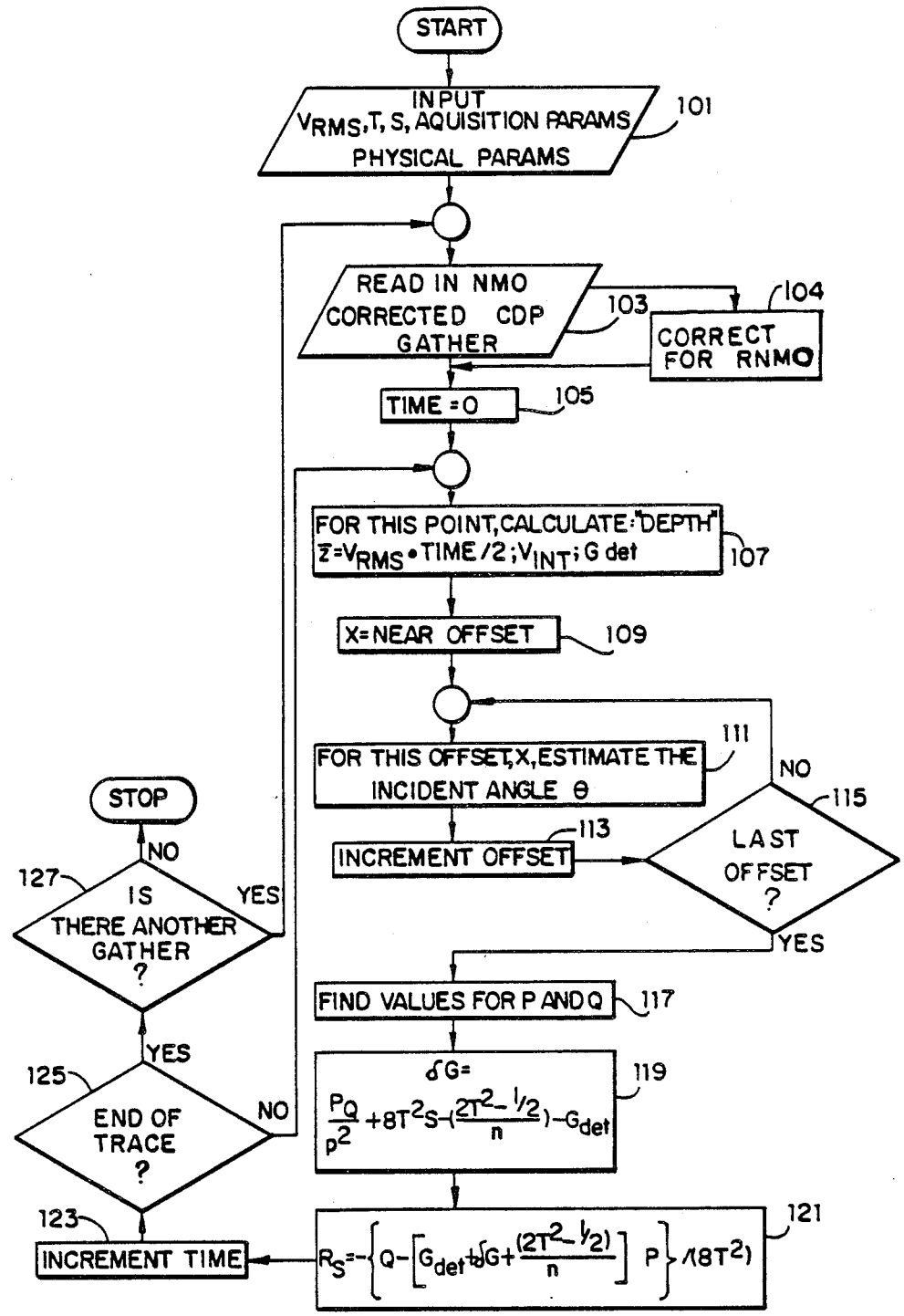
FIG. 3 illustrates, in flow chart form, a method for estimating shear wave reflection data for an area undergoing seismic exploration from acquired compressional wave reflection data for that area.

Turning next to FIG. 3, the method of the invention is now disclosed. Such a method may be embodied on a representative computer program which can be run on commercially available general purpose digital computers.

Commencing at step 101, values for $V_{RMS}$, T, S, and acquisition (shooting) and physical parameters are acquired utilizing the seismic acquisition apparatus of FIG. 1 and input to the computer. Here $V_{RMS}$ represents stacking velocities ($V_{st}$), $$T=<V'_s/V'_p> \tag{17}$$

which is a filtered (smoothed version of $V'_s/V'_p$ data obtained from actual borehole logs; and $$S = \frac{<R'_p\ R'_s>}{<R'^2_p>}$$

which is filtered (smoothed) statistical data also obtained from actual borehole logs. The acquisition parameters include types of sources and receivers used in array parameters. The physical parameters include an elastic attenuation parameter q.

Proceeding next to step 103, NMO corrected CDP trace gathers are read into the computer (these traces are also pre-processed to correct for near surface static, if required, eg., for land shootings). At step 104, the NMO corrected CDP trace is then corrected for residual NMO according to the method of FIG. 9.

Pseudoshear estimates are very sensitive to small errors in NMO velocity. Normal moveout is a systematic shift to longer reflection times with increasing source-receiver offsets. A typical normal moveout correction method as utilized above for correcting the CDP trace gathers prior to reading into the computer will flatten seismic events along the time horizon. While somewhat effective, NMO correction methods tend to leave some residual moveout in the data. Moveout errors can be expressed as errors in stacking velocities which may significantly degrade seismic migration results and will cause the misalignment of amplitudes that will, in turn, mask the true amplitude-offset behavior from reflectors within the earth. Corrections for residual normal moveout are estimated for each time sample from the amplitude-offset behavior of primary reflectors is determined.

A method of correcting for residual normal moveout (RNMO) by estimating the residual NMO at each time sample from the amplitude-offset behavior at primary reflectors R(X,T) for acquired seismic data after normalized moveout (NMO) correction has been accomplished is now described. The desired result, correct to first order in variations of the physical properties, is:

$$R(xT_o) = P(T_o) + \left[Q_o - \frac{\delta V}{V_{old}}T_o\left(\frac{V_o}{V_{old}}\right)^2 P\right]\frac{x^2}{T_o^2V_o^2} \tag{18}$$

where:

$V_{old} + \delta V$ is the correct stacking velocity;
$T_o$ is the two-way travel time at normal incidence;
x is the offset distance;
$V_o$ is the reference velocity;
P and $Q_o$ are coefficients of a first order expansion of the Zoeppritz equation for P-wave reflectivity; and P' is the first time derivative of P.

From Equation (18) $\delta V$ is estimated from a time shift statistics as:

$$\delta t = \frac{P'Q_o - \frac{\delta V}{V_{old}} T_o \left(\frac{V_o}{V_{old}}\right)^2 p'^2}{p'^2} \quad (19)$$

where:
$<\ >$ is a time average in a window centered on $T_o$.

In most cases, $<P'Q_o>$ would be negligible in comparison with $<P'P'>$. Thus, equation (17), which has dimensions of time, becomes $$\delta t = -\frac{\delta V}{V_{old}} T_o \left(\frac{V_o}{V_{old}}\right)^2 \quad (20)$$

Relating time shift t to residual NMO yields:

$$T_{RES} = T_o - \delta t \left(\frac{x^2}{T_o^2 V_o^2}\right) \quad (21)$$

Figure 9:
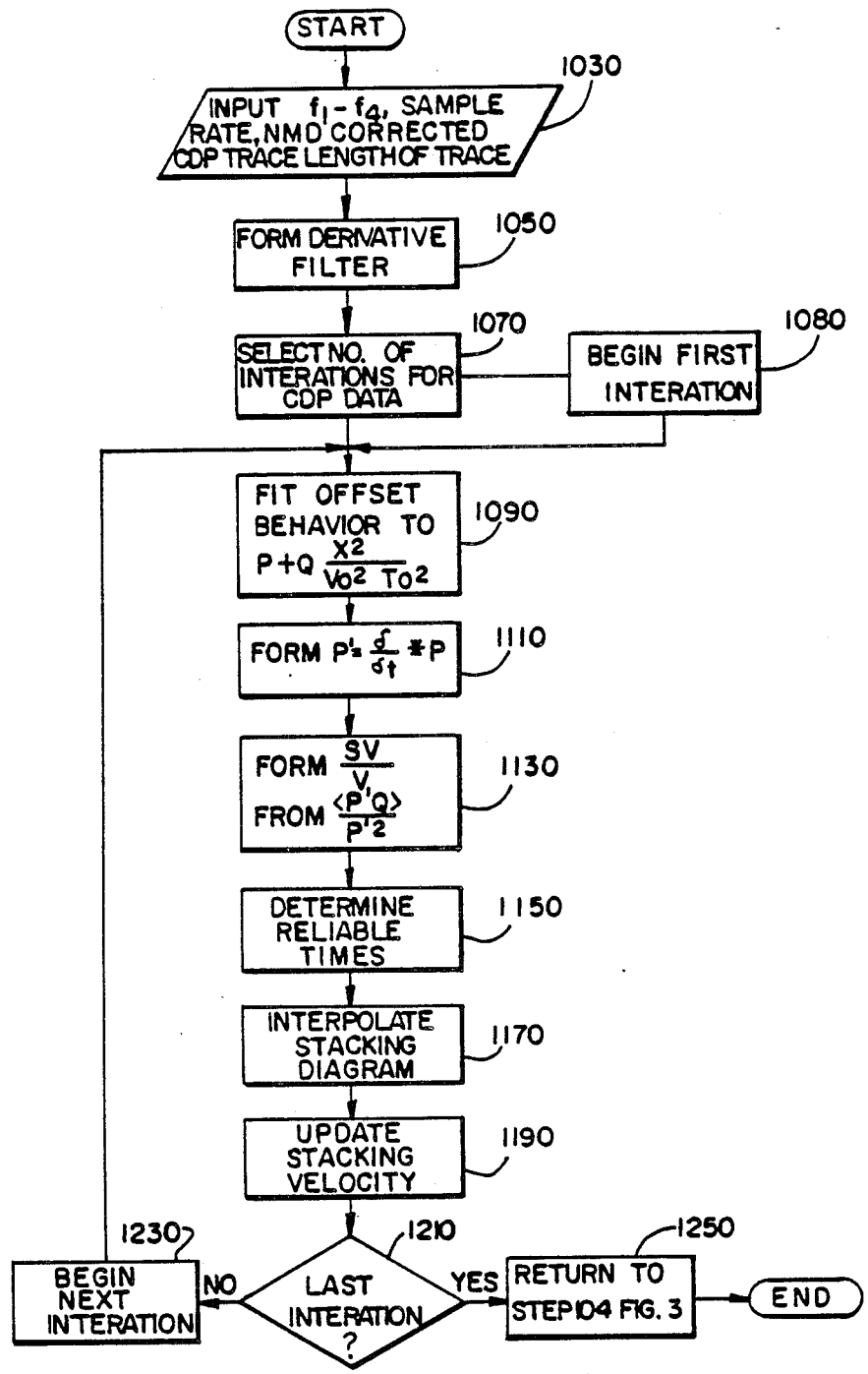
FIG. 9 illustrates in flow chart form, a method for correcting for residual normalized moveout (RNMO) of the seismic data.
Figure 10A:
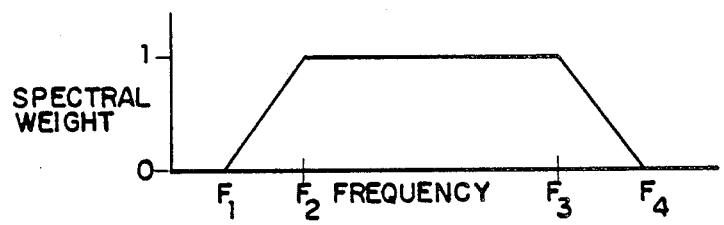
FIG. 10a illustrates the band pass of a derivative filter to be constructed as part of the method of FIG. 9.

Turning next to FIG. 9, the method of correcting for residual NMO effects of the present invention is hereby disclosed. At step 1030, the corner frequencies of reliable CDP data ($f_1$, $f_2$, $f_3$, $f_4$) (as illustrated in FIG. 10a and determined by well known methods of analysis of the CDP data), the physical parameters such as the NMO-corrected CDP gather, trace length, sample rate, and offsets are inputted into a digital computer of common design. In alternate embodiments of the invention, a lower limit on the signal-to noise ratio (S/$N_{min}$) and stacking velocity diagram may also be included as input to the digital computer. The signal-to-noise ratio may be used when selection of data where time shifts are to be applied is desired. The stacking velocity diagrams may be used when corrections to the stacking velocities is desired. The digital computer may either be the same digital computer that performs the pseudoshear estimation method of FIG. 3 or may be a second digital computer tied to the digital computer used in determining the pseudoshear estimation by conventional means.

Figure 10B:
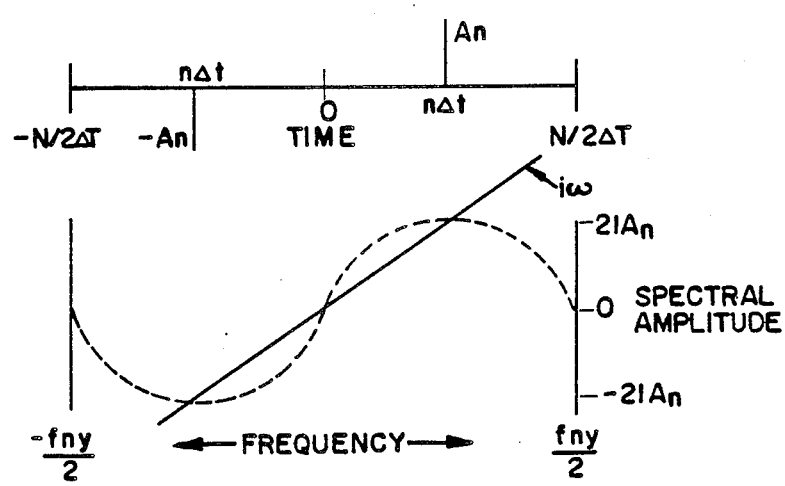
FIG. 10b illustrates the construction of the derivative filter of FIG. 10a in the frequency domain.

At step 1050, a band-limited derivative filter is calculated by a weighted, least-squares fit to the "iw" frequency response of the derivative of a trapezoidal weighting function from the corner frequencies $f_1$, $f_2$, $f_3$ and $f_4$, the sample rate, and length of trace (i.e. length of filter) are used to form the derivative filter. Referring to FIG. 10b, it should be noted that the discrete Fourier transform of an asymmetric pair of spikes of amplitude $\pm A_n$ spaced at $\pm n\Delta t$ from time zero is $-2iA_n^* \sin(2\pi n \Delta f)$. Therefore, finding the best (2m+1) point filter reduces to fitting m sinusoids to a linear curve.

Returning to step 1070 of FIG. 9, the number of iterations of RNMO correction for the input CDP data is selected. Where large residual NMO errors, i.e. 5–10% errors in the stacking velocities are present, it has been found that nearly perfect time alignments of the reflected events shall be achieved after less than 10 iterations. For typical applications of the present invention, careful analysis of the CDP data should limit the velocity error to less than 3%. Therefore, the selection of 5 iterations is specifically contemplated as satisfactorily removing the expected velocity errors. At step 1090, the offset behavior is fitted for each time point and an estimate of noise for each time point is calculated. For such a calculation, the offset behavior is fitted to the equation:

$$P + Q\left(\frac{x^2}{V_o^2 T_o^2}\right) \quad (22)$$

for each time point of the input CDP data. $V_o$ may be assumed to be any arbitrary velocity, although an arbitrary selection of $V_o = 6,000$ ft/sec is recommended for stable calculations. Letting $R(T_o,X)$ be the offset data from the input CDP traces at NMO corrected time $T_o$, $$R(T_o,X) \sim P(T_o) + Q(T_o)\frac{x^2}{V_o^2 T_o^2} \quad (23)$$

Equation (23) may then be solved using methods well known in the art for $P(T_o)$ and $Q(T_o)$. In the embodiment of the invention where S/$N_{min}$ are measured, the signal-to-noise ratio is also calculated here according to the equation:

$$\frac{p^2(T_o)}{p^2(T_o) + \sigma^2(T_o)} \quad (24)$$

where:
the variance $\sigma^2(T_o)$ is estimated according to the equation below.

$$\sigma^2(T_o) = \left(\frac{1}{N-2}\right)\left[\left(R(T_o, X) - P(T_o) - Q(T_o)\left(\frac{x^2}{V_o^2 T_o^2}\right)\right)\right] \quad (25)$$

Proceeding to step 1110, the derivative filter determined at step 1050 is convolved with the forward Fourier transform of the P trace determined at step 1090 to calculate the frequency domain P' trace which is then transformed back to the time domain. At step 1130, $\delta V/V$ is determined from the following relationship:

$$P'Q/<P'^2> \quad (26)$$

where:
$<P'Q/<p'^2>$ is calculated in moving windows of time.
As it is known that:

$$Q = -\left(\frac{\delta V}{V_{old}}\right) T_0 \left(\frac{V_o}{V_{old}}\right)^2 p' \quad (27)$$

P' is solved with a weighted least square fit over a time window centered at $T_0$ so that:

$$\frac{\delta V}{V_{old}} T_o \left(\frac{V_o}{V_{old}}\right)^2 = \frac{\Sigma\, W_t P_t' Q_t}{\Sigma\, W_t P_t'^2} = \delta t \tag{28}$$

where:

$W_t$ is the cosine weight for the $T_{th}$ sample within the window;

$P'Q$, and $P'^2$ are formed, convolved with a raised cosine weighting function $w$ and then divided to get an estimate at each time point.

At step 1150, reliable times are determined for the embodiment of the invention which uses signal-to-noise ratios. If a signal-to-noise ratio has been provided, the input provides a cut-off value for how many ($\delta V$, time) values determined above should be used. Between values, linear interpretation of the usable values would be utilized in the determination of the curve.

Proceeding to step 1170, a stacking velocity function $V_{st}$ is formed in exactly the same way as the stacking of the initial NMO corrected data. At 1190, the stacking velocities are updated according to the equation $$V_{new} = V_{old} + \left[\frac{\delta V}{V_{old}} T_o \frac{V_o}{V_{old}}\right] \frac{V_{old}}{T_o} \left(\frac{V_{old}}{V_o}\right)^2 \tag{29}$$

Proceeding to step 1210, a determination is made if the desired number of iterations of the CDP data by correction of the velocities have been performed. If additional iterations of the CDP data is desired, the routine returns to step 1090 to perform the next iteration of velocity corrections to the corrected velocity CDP data calculated at step 1190. If it is determined at step 1210 that all CDP gathers have been corrected for velocity the requisite number of iterations so that the RNMO offset of the NMO-corrected CDP data has been removed, the method of the present invention returns at step 1250 to step 105 of FIG. 3.

Figure 11:
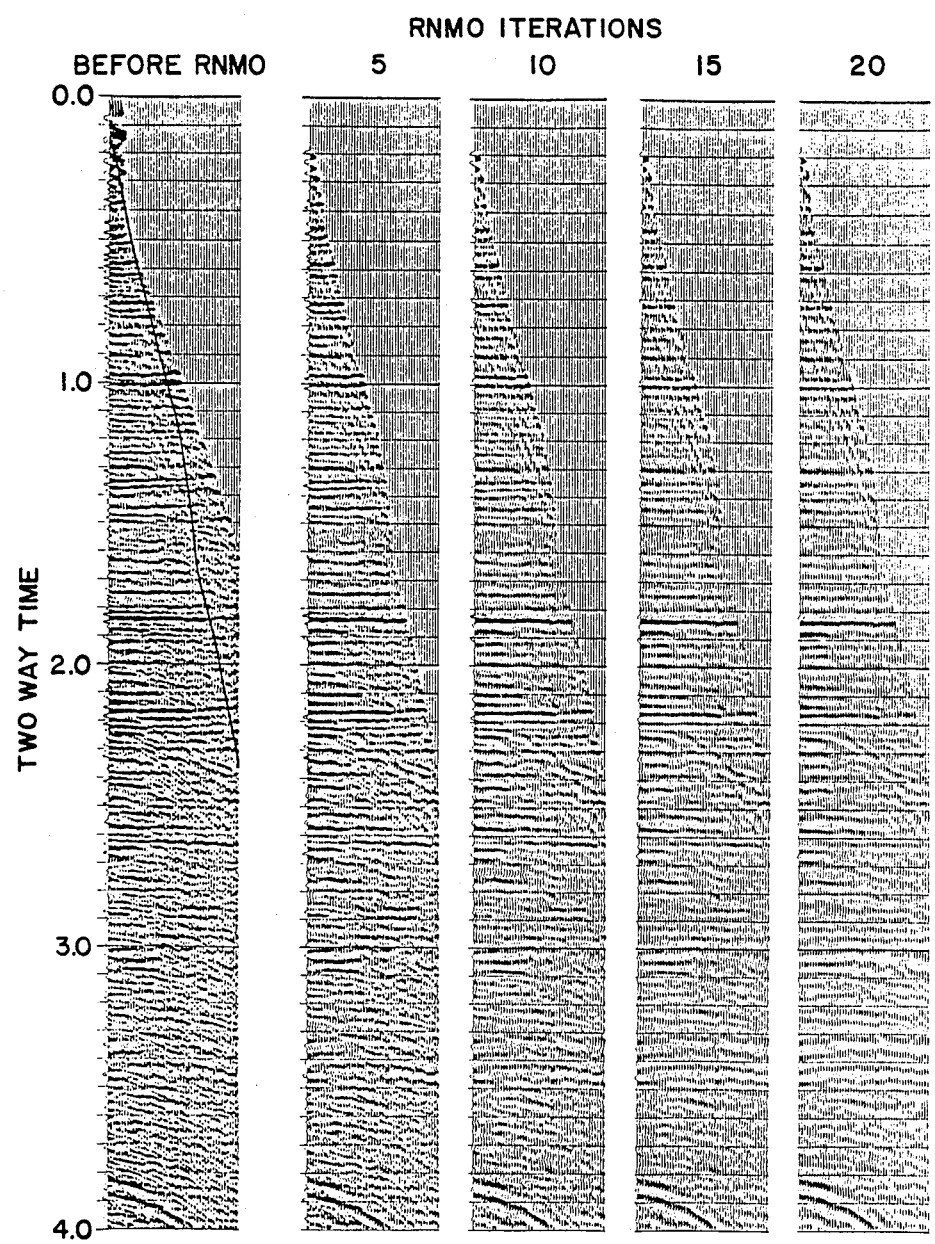
FIG. 11 illustrates the effect of RNMO correction on seismic data.

An example of the removal of RNMO offsets from seismic data may be seen by reference to FIG. 11 which shows NMO corrected CDP data prior to RNMO correction, as well as RNMO data corrected to 5, 10, 15 and 20 iterations. Step 105 of FIG. 3, a time T=0 is set in a time counter. Following this, in step 107, for the time then set in the time counter, a "depth"=Z is calculated as:

$$z = V_{RMS} \cdot \frac{\text{TIME}}{2} \tag{30}$$

as is an estimated interval of velocity $V_{INT}$, and a deterministic component $G_{det}$ of the influencing factors on amplitude vs. offset behavior. For example, certain deterministic factors are governed by known equations. These include spherical spreading (SS), which is defined as $$SS = -(1/2)\, V^{(3)}/V_{INT}^3 \tag{31}$$

Where:

$$V^3 = (1/T) \int_0^T V_{INT}^3 \cdot t\, dt \tag{32}$$

where:

T = a one-way travel time; source receiver directivity in arrays (SRD), which is defined as $$SRD = -1/6(\pi sl)^2 / V_{INT}^2 \tag{33}$$

where:

s represents the frequency of the source signal;
l = array length; and attenuation (AT), which is defined as $$AT = -1/q(\pi sl / V_{INT}^2)\, V_{RMS} \tag{34}$$

Using these equations, $G_{det}$ can be determined for these influencing factors. Thereafter, in step 109, a counter is set, with the near offset value x for the gathered trace having the smallest incident angle $\theta$ and in step 111, this incident angle $\theta$ is estimated using the equation:

$$\sin^2\theta = \left(\frac{V_{INT}}{V_{RMS}} \cdot \frac{x^2}{x^2 + 4x^2}\right) \tag{35}$$

In subsequent step 113, the offset counter x is incremented, with the next offset value x (the offset of the next trace in the gather moving toward the trace having the farthest offset), and in step 115, a determination is made of whether all offsets (all traces) have been processed. If not, the incident angle $\theta$ is estimated for the newest offset x incremented at step 113.

While the above method produces a satisfactory estimation of the incident angle $\theta$, incident angle $\theta$ may be calculated more precisely using the following alternate method which is now described with reference to FIG. 12.

Typically, seismic exploration is conducted of a subsurface formation of several layers having different geological characteristics. See, for example, FIG. 1 which shows two exemplary layers for the subsurface formation under investigation. For purposes of the following derivation, $U_i$ is hereby defined as the velocity at the top of layer 1, t is defined as the time at which the generated seismic energy enters layer 1, $V_i$ is the velocity within layer 1 and where has units of acceleration and is an input parameter. Therefore, the velocity $V_i$ within layer 1 is determined at step 2030 as $$V_i = U_i = a_1(t - t_i) \tag{36}$$

The values for $U_1$ for the traces is then determined at step 2050 according to the following method. Beginning with the definition of the mean-squared velocity:

$$V_i^2 = (1/t_i) \int_0^{t_i} V^2\, dt \tag{37}$$

then:

$$t_{i+1} V_{i+1}^2 - t^i V_i^2 = \int_{t_i}^{t_{i+1}} V^2\, dt \tag{38}$$

Assuming linearly increasing velocities for the layer gives:

$$t_{i+1} V_{i+1}^2 - t^i V_i^2 = \int_{t_i}^{t_{i+1}} [U_i + a_i(t - t_i)]^2 dt \quad (39)$$

which results in the following quadratics expression for $U_i$:

$$(t_{i+1} - t_i)U_i^2 + a_i(t_{i+1} - t_i)^2 U_i + (a_i/3)(t_{i+1} - t_i)^3 - t_{i+1}V_{i+1}^2 + t_i V_i^2 = 0 \quad (40)$$

After the $U_i$ are calculated at step 2050, a smoothed interval velocity function is obtained at step 2070 by averaging the two velocity estimates at each interface and interpolating the results in time with a cubic spline.

Incident angles are then calculated at step 2090 from the offset and moments of the smoothed interval velocity function calculated at step 2070. For purposes of the following derivation, the following notation is used:

t = one-way travel time;
$\rho$ = density;
$\alpha$ = compressional wave velocity;
$\beta$ = shear wave velocity;
$\theta$ = incident angle (where $\theta_i$ will denote incident angle for the ith reflector and $\theta_o$ will denote the incident angle at the surface;

$$V^{(n)} = (1/t) \int_0^{tan} (t') dt'$$

$Z_i$ = thickness of ith layers;
$X_i$ = lateral distance transversed by ray in ith layer;
X = total offset.
Then for any layer:

$$X_j = Z_j \tan \theta_j = Z_j[P\alpha_j + \tfrac{1}{2}P^3 \alpha_j^3 \ldots] \quad (41)$$

Integrating yields:

$$X = \int_0^z p\alpha dz + (1/2) \int_0^z p^3 \alpha^3 dz + \ldots \quad (42)$$

Substituting $dz = \alpha dt$, and $$X = P V^2 t + (\tfrac{1}{2}) P^3 V^4 t + \ldots \quad (43)$$

Inverting and substituting $P = (\sin \theta/\alpha)$ yields:

$$\sin\theta = \frac{\alpha X}{V^2 t} - \frac{\alpha}{2} \frac{V^4}{V^2} \left(\frac{X}{V^2 t}\right)^3 + \ldots \quad (44)$$

$$\sin^2\theta = \frac{\alpha_2}{V^2} \left[\frac{(2X)^2}{(2X)^2 + 4V^2 t^2}\right] \quad (45)$$

Figure 12:
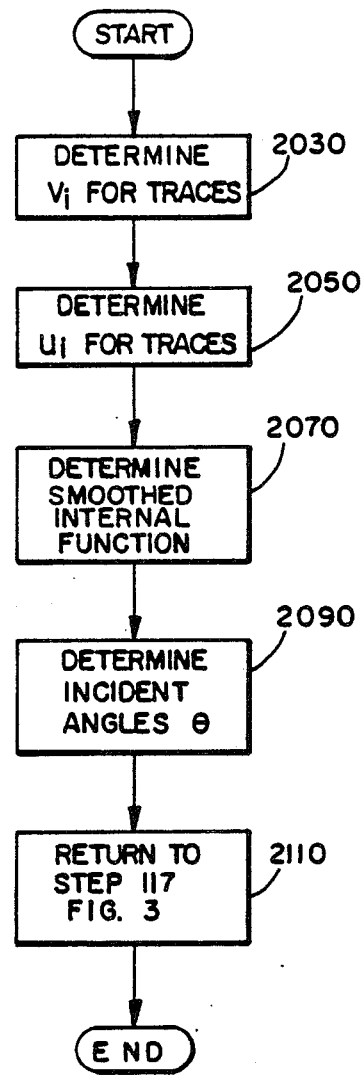
FIG. 12 illustrates, in flow chart form, an alternate method of calculating the angle of incidence for the generated compressional waves.

In this embodiment of the invention, after the incident angles are calculated, the algorithm returns at step 2110 to step 117 of FIG. 3, where after all offsets x have been processed to estimate the corresponding incident angles $\theta$ according to the method of steps 111–115 of FIG. 3 or all incident angles are calculated using the method of FIG. 12, the processing computer proceeds to step 117, where it calculates values for P and Q using Equation (7) and a least means squared recursive processing technique. Following this, the computer proceeds to step 119, where an estimate is made of the component of amplitude versus offset behavior which is not due to a shear wave velocity component $G_{det}$ calculated in step 107. This estimate G is made in accordance with the equation $$G \approx \frac{PQ}{p^2} + 8T^2 S - \frac{(2T^2 - 1/2)}{n} - G_{det} \quad (46)$$

Following this, in step 121, a shear wave reflectivity component $R_s$ is calculated from the equation:

$$R_s = -\left[Q - \left[G_{det} + \delta G + \frac{2T^2 - 1/2}{n}\right]p\right]/8T^2 \quad (47)$$

which is a rewritten version of Equation (16). The computer then proceeds to step 123, where the TIME counter is incremented. In the next step 125, a determination is made of whether the end of the processed traces has been reached. If not, the computer proceeds back to step 107, with a new trace time value and repeats steps 107 through 123. If the end of the traces is reached, it is determined in step 125, following which the computer proceeds to step 127, where it determines if all NMO corrected gathers have been processed. If they have, the program ends, if not, the computer proceeds to step 103 and begins processing a new trace gather.

In step 121, the computer calculates shear wave reflectivity coefficients which can then be applied to the gathered traces to produce traces representing shear wave reflection traces. These shear wave traces can then be used in conventional manner (CDP stacked) to produce pseudoshear wave seismic sections.

Figure 6:
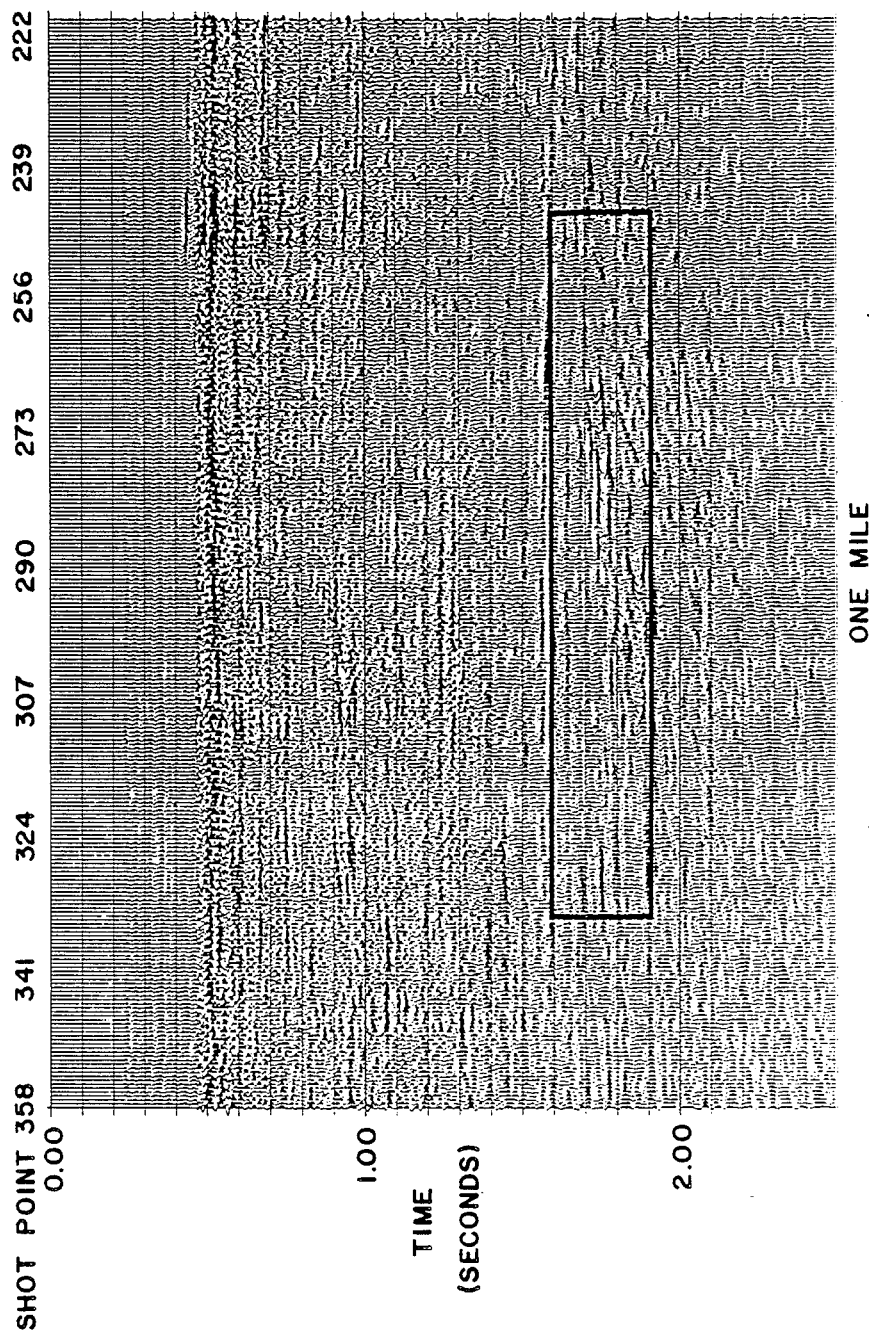
FIG. 6 illustrates a pseudoshear seismic section estimated by the method of FIG. 3 utilizing the data of FIG. 5.
Figure 7:
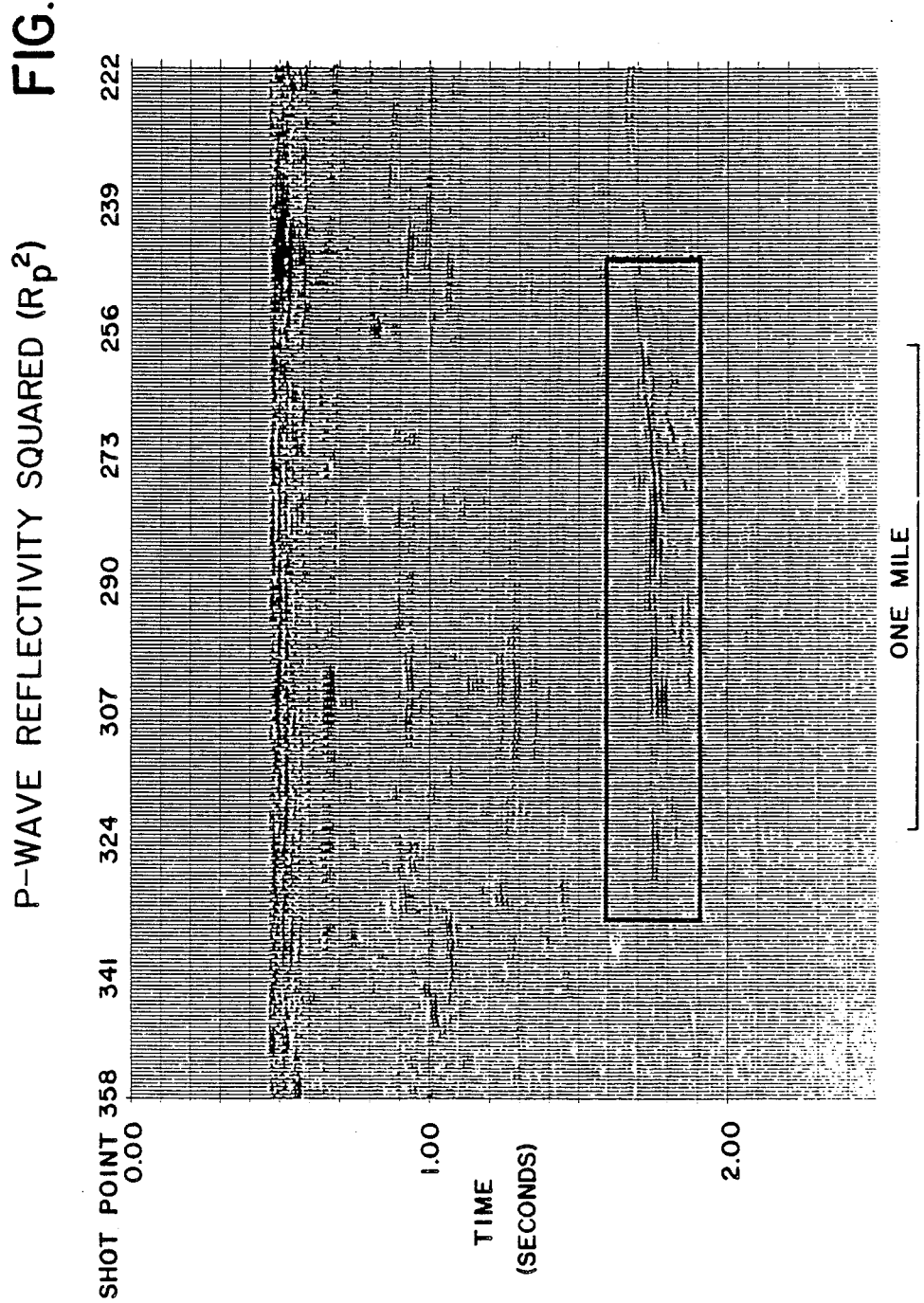
FIG. 7 illustrates the square of the compressional wave seismic section of FIG. 5.

Upon completion at step 121 of the calculation of a pseudoshear wave seismic section, comparative analysis of amplitude anomalies of the compressional and pseudoshear wave sehsmic sections commences for determination of the presence or absence of positive hydrocarbon indicators. A compressional wave section and an estimated pseudoshear wave section for a geological formation may be seen by reference to FIGS. 6 and 7 respectively. In FIGS. 6 and 7, portions of the seismic sections which include amplitude anomalies which may be indicative of either hydrocarbon or lithological formations are highlighted. Alternate methods of comparison of the compressional wave seismic section and the correlating estimated pseudoshear wave seismic section are more precisely described with reference to the flow charts of FIGS. 4a–d.

Figure 4A:
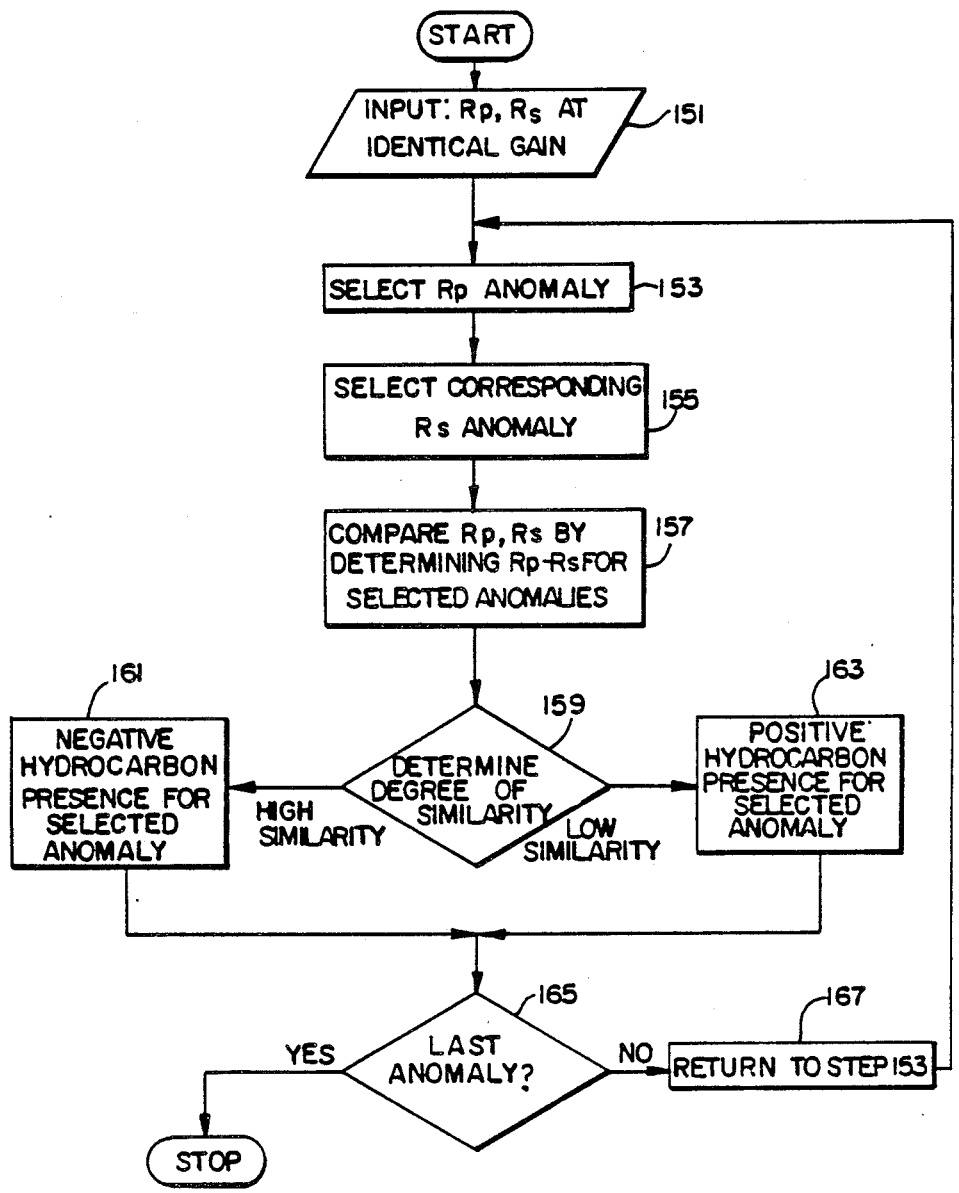
FIGS. 4a-d illustrate, in flow chart form, alternate methods for comparing compressional wave data acquired by seismic exploration to pseudoshear wave reflection data estimated by the method of FIG. 3 for determining the presence of positive hydrocarbon indicators for the geological formation causing compressional wave reflection and/or pseudoshear wave reflection data anomalies.

Turning first to FIG. 4a, a first method of comparative analysis of the present invention commences at step 151 with the input of seismic sections $R_p$ and $R_s$ at identical gains. A portion of the compressional wave seismic section which includes an amplitude anomaly possibly indicative of hydrocarbons in the subsurface formation under investigation is selected at step 153. Portions of the $R_s$ section which corresponds to the selected portion of the $R_p$ section is selected at 155. At step 157, the selected $R_p$ and $R_s$ sections compared. Comparison of $R_p$ and $R_s$ may be accomplished by determining $R_p - R_s$ for the selected anomaly. If a high degree of similarity between the selected anomalies (i.e. $R_p - R_s = 0$) is indicated at step 159, a negative hydrocarbon presence for the selected portion of the $R_p$ section is determined at step 161. If a low degree of similarity between the selected anomalies (i.e. $R_p - R_s$ does not approach zero), is indicated at step 159, a positive hydrocarbon presence for the selected portion of the $R_p$ section is determined at step 163. If it is determined at step 165 that the last compressional wave seismic section amplitude anomaly of interest has been processed, then the algorithm ends. If there are additional compressional wave seismic section amplitude anomalies of interest, the algorithm is returned at step 167 to step 153 for further processing.

Figure 4B:
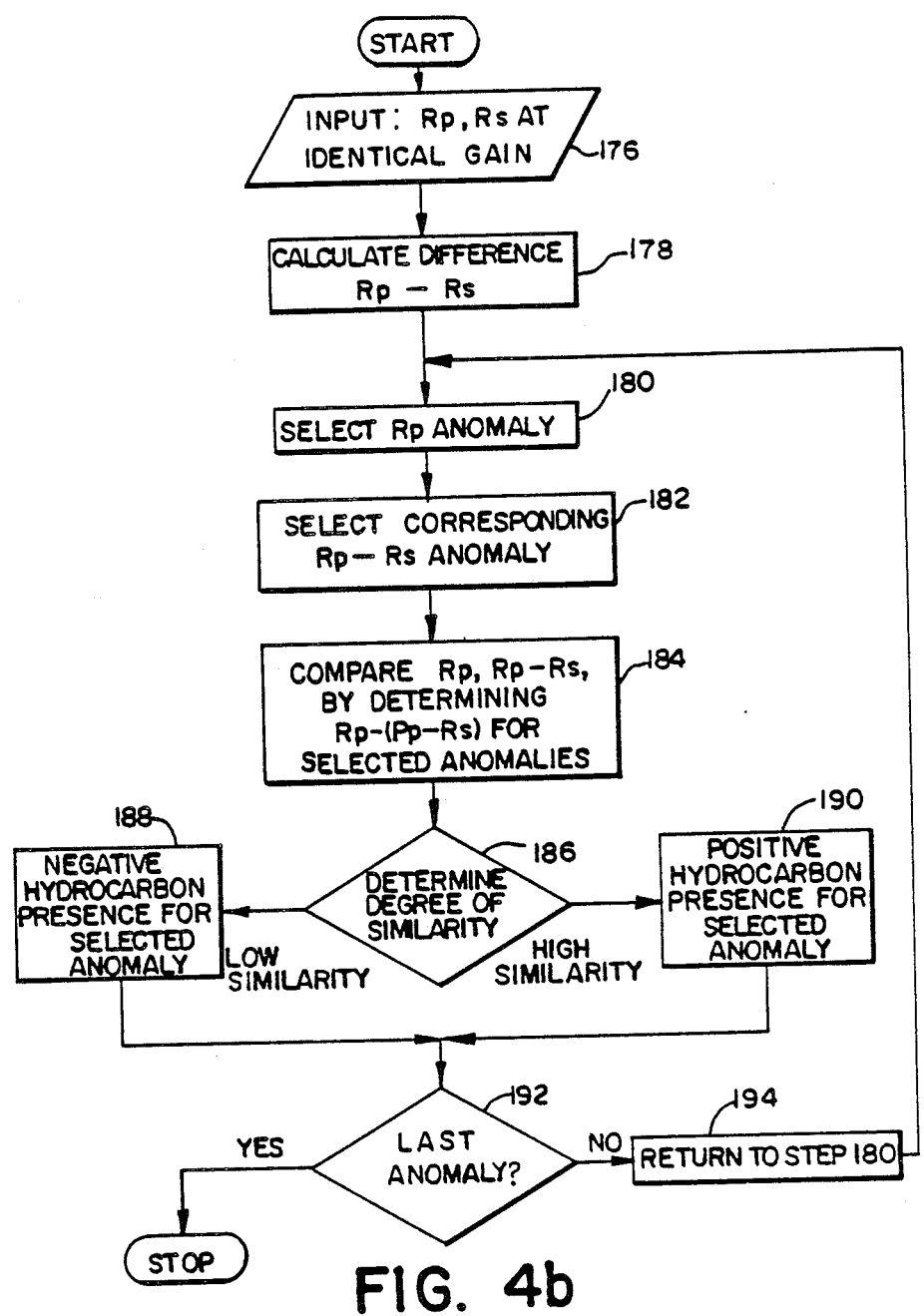

Turning next to FIG. 4b, a second method of comparative analysis of the present invention commences at step 176 with the input of seismic sections $R_p$ and $R_s$ at identical gains. Proceeding next to step 178, the amplitude difference of the compressional wave and pseudoshear wave seismic sections ($R_p - R_s$) is calculated. At step 180, a portion of the compressional wave seismic section which includes an amplitude anomaly possibly indicative of hydrocarbons in the subsurface formation under investigation is selected. The portion of the $R_p - R_s$ section which corresponds to the selected portion of the $R_p$ section are selected at 182. At step 184, the selected $R_p$ section and the selected $R_p - R_s$ section which corresponds to the previously selected portion of the $R_p$ section are compared. If a low degree of similarity (i.e. a large amplitude anomaly for the selected portion of the $R_p$ section and little, if any, amplitude anomaly for the selected portion of the $R_p - R_s$ section) is indicated at step 186, a negative hydrocarbon presence for the selected portion of the $R_p$ section is determined at step 188. If a high degree of similarity (i.e. similar amplitude anomalies present for the selected portions of the $R_p$ and $R_p - R_s$ sections) is indicated at step 186, a positive hydrocarbon presence for the selected portion of the $R_p$ section is determined at step 190. If it is determined a step 192 that the last compressional wave seismic section amplitude anomaly of interest has been processed, then the algorithm ends. If there are additional compressional wave seismic section amplitude anomalies of interest, the algorithm is returned at step 194 to step 180 for further processing.

Figure 4C:
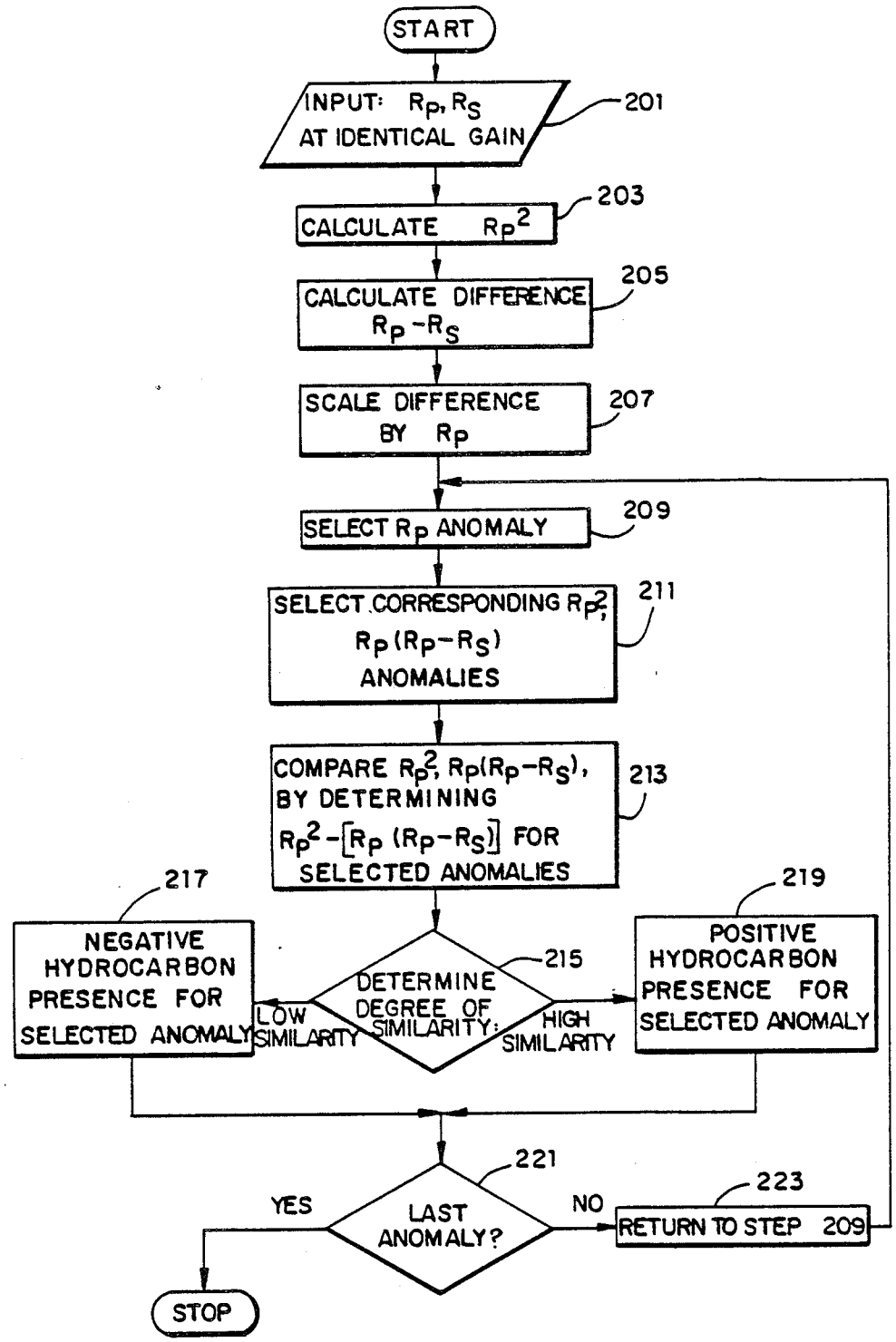
Figure 8:
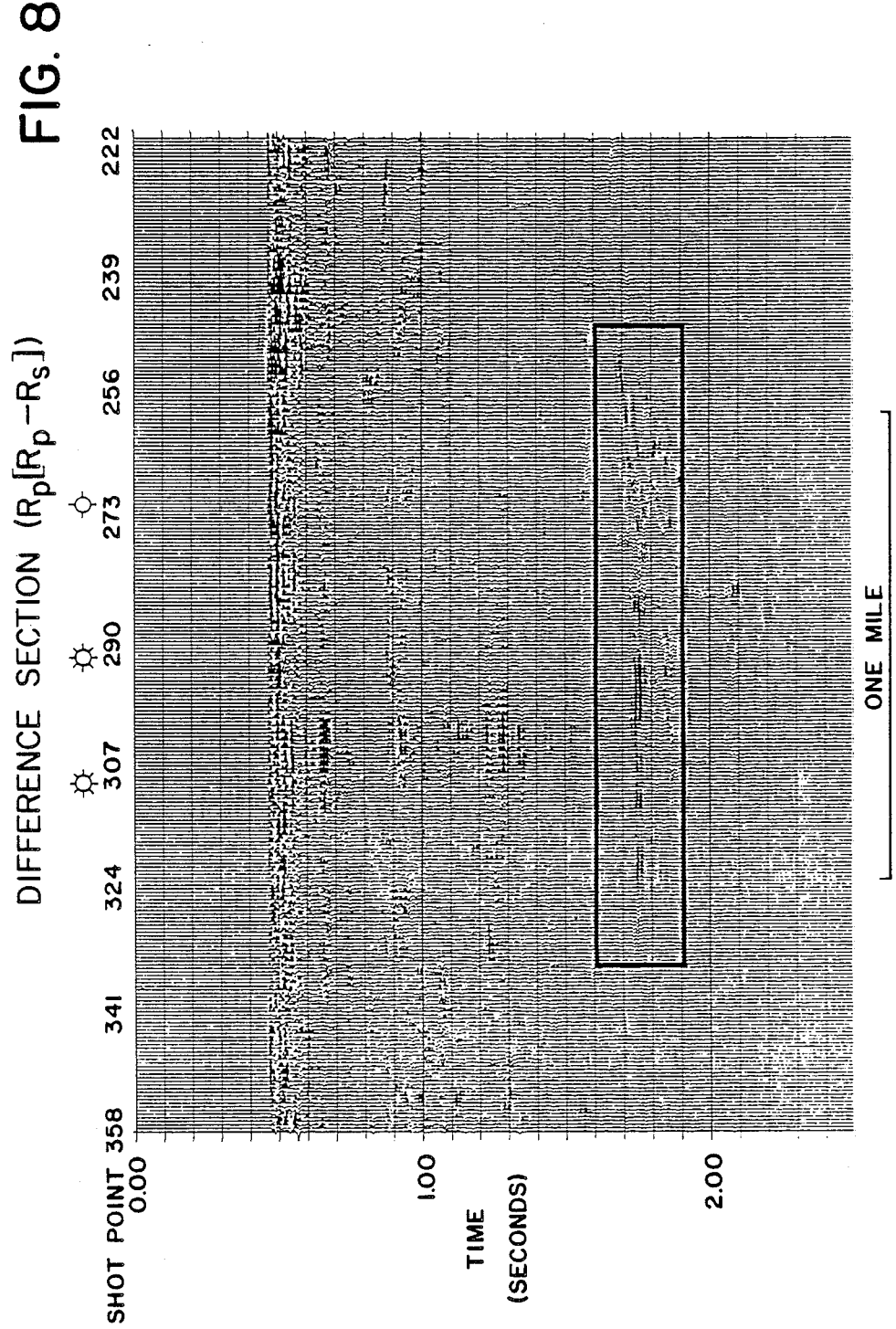
FIG. 8 illustrates a seismic section calculated by the comparative analysis method for comparing compressional wave reflection information and estimated pseudoshear wave reflection information.

Turning next to FIG. 4c, a third method of comparative analysis of the present invention commences at step 201 with the input of seismic sections $R_p$ and $R_s$ at identical gains. The compressional wave seismic section $R_p$ is squared at step 203 to calculate $R_p^2$ for the compressional wave seismic section. Proceeding next to step 205, the amplitude difference of the compressional wave and pseudo-shear wave seismic sections ($R_p - R_s$) is calculated. At step 207, this amplitude difference $R_p - R_s$ is scaled to the same magnitude as the $R_p^2$ seismic section by multiplying the amplitude difference ($R_p - R_s$) by $R_p$. A comparison of the $R_p^2$ and the $R_p(R_p - R_s)$ seismic sections for the same seismic data may be seen by reference to FIGS. 7 and 8, respectively. In FIGS. 7 and 8, portions of the seismic sections correlating to the amplitude anomalies of FIGS. 5 and 6 are highlighted.

Returning to FIG. 4c, a portion of the compressional wave seismic section which includes an amplitude anomaly possibly indicative of hydrocarbons in the subsurface formation under investigation is selected at step 209. Portions of the $R_p^2$ and $R_p(R_p - R_s)$ sections which correspond to the selected portion of the $R_p$ section are selected at 211. At step 213, the selected $R_p^2$ section and the selected $R_p(R_p - R_s)$ section which corresponds to the previously selected portion of the $R_p$ section are compared. If a low degree of similarity (i.e. a large amplitude anomaly for the selected portion of the $R_p^2$ section and little, if any, amplitude anomaly for the selected portion of the $R_p(R_p - R_s)$ section) is indicated at step 215, a negative hydrocarbon presence for the selected portion of the $R_p$ section is determined at step 217. If a high degree of similarity (i.e. similar amplitude anomalies present for the selected portions of the $R_p^2$ and $R_p(R_p - R_s)$ sections) is indicated at step 215, a positive hydrocarbon presence for the selected portion of the $R_p$ section is determined at step 219. If it is determined at step 221 that the last compressional wave seismic section amplitude anomaly of interest has been processed, then the algorithm ends. If there are additional compressional wave seismic section amplitude anomalies of interest, the algorithm is returned at step 223 to step 209 for further processing.

Figure 4D:
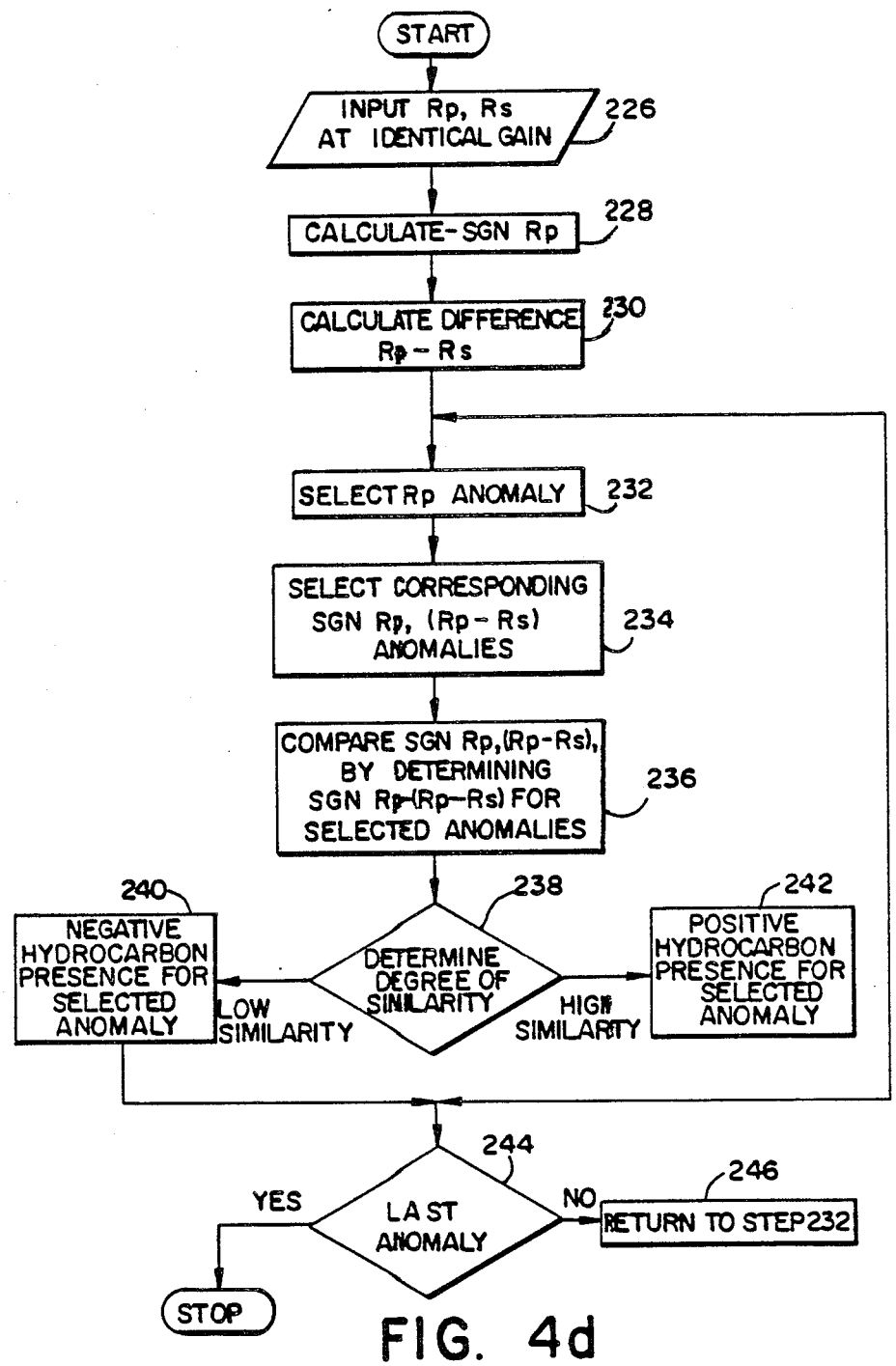

Turning next to FIG. 4d, a fourth method of comparative analysis of the present invention commences at step 226 with the input of seismic sections $R_p$ and $R_s$ at identical gains. The compressional wave seismic section $R_p$ is multiplied by negative 1 at step 228 to calculate sign $R_p$ for the compressional wave seismic section. Proceeding next to step 230, the amplitude difference of the compressional wave and pseudoshear wave seismic sections ($R_p - R_s$) is calculated. A portion of the compressional wave seismic section which includes an amplitude anomaly possibly indicative of hydrocarbons in the subsurface formation under investigation is selected at step 232. Portions of the sign $R_p$ and ($R_p - R_s$) sections which correspond to the selected portion of the $R_p$ section are selected at 234. At step 236, the selected sign $R_p$ section and the selected ($R_p - R_s$) section which corresponds to the previously selected portion of the $R_p$ section are compared. If a low degree of similarity (i.e. a large amplitude anomaly for the selected portion of the sign $R_p$ section and little, if any, amplitude anomaly for the selected portion of the ($R_p - R_s$) section) is indicated at step 238, a negative hydrocarbon presence for the selected portion of the $R_p$ section is determined at step 240. If a high degree of similarity (i.e. large amplitude anomalies present for the selected portions of the sign $R_p$ and ($R_p - R_s$) sections) is indicated at step 238, a positive hydrocarbon presence for the selected portion of the $R_p$ section is determined at step 242. If it is determined at step 244 that the last compressional wave seismic section amplitude anomaly of interest has been processed, then the algorithm ends. If there are additional compressional were seismic section amplitude anomalies of interest, the algorithm is returned at step 246 to step 232 for further processing.

Thus, there has been described and illustrated herein a preferred embodiment for an improved method for estimating a pseudoshear seismic section for a geological formation from a compressional wave seismic section for that formation. However, it will be apparent to those skilled in the art that numerous modifications can be made thereto without departing from the spirit and scope of the invention. Accordingly, the invention is not limited by the foregoing description, but it is only limited by the scope of the appended claims.

What is claimed is:

1. A method of producing shear wave reflection information estimated from compressional wave reflection information comprising the steps of:

generating descending acoustic waves from a plurality of acoustic wave sources and receiving and recording at a plurality of receivers ascending waves produced at a subsurface interface;

gathering said recorded reflection waves into sets of different source-receiver offsets having a common reflection boundary;

correcting said gathered reflection waves for normal moveout;

measuring amplitudes of said gathered waves at given points in time for different source-receiver offset values;

determining velocities of said acoustic wave at the top of each subsurface interface and within the earth medium below each of said subsurface interfaces, averaging said velocities for each of said subsurface interfaces and the earth medium below and interpolating with time to provide smoothed interval velocity functions for said gathered traces over said subsurface interfaces;

determining incident angles of said gathered traces from said offset and said smoothed interval velocity functions; and determining directly from said measured amplitude offset values and said incident angles of said gathered trace shear wave reflection information such that said information is equivalent to shear wave reflection information that would be obtained by direct measurement using shear waves.

2. The method of claim 1 wherein the step of determining incident angles of said gathered traces from said offsets and said smoothed interval velocity functions is calculated according to the equation:

$$\sin^2\theta = \frac{\alpha_2}{V^2}\left[\frac{2(X)^2}{(2X)^2 = 4V^2t^2}\right],$$

where,
$\theta$ = incident angle of a gathered trace,
t = time of reflection,
V = smoothed interval velocity,
X = offset value of a gathered trace, and
$\alpha$ = compressional wave velocity.

3. A method of producing shear wave reflection information for compressional wave reflection information comprising the steps of:

generating descending acoustic waves from a plurality of acoustic wave sources and receiving and recording a plurality of receivers ascending waves produced at a subsurface interface;

gathering said recorded reflection waves into sets of source-receiver offsets having a common reflection boundary;

correcting said gathered reflection waves for normal moveout;

measuring amplitudes of said gathered waves at given points in time for different source-receiver offset values;

determining velocities of said acoustic wave at the top of each subsurface interface and within the earth medium below each of said subsurface interfaces, averaging said velocities for each of said subsurface interfaces and the earth medium below and interpolating with time to provide smoothed interval velocity functions for said gathered traces over said subsurface;

determining incident angles of said gathered traces from said offsets and said smoothed interval velocity functions;

determining for each said point in time a value $G_{det}$ which represents a quantified value of known factors which influence variations in said measured amplitudes with offset;

estimating for each said point in time a component of amplitude variation with offset $\delta G$ which is not due to a shear wave component and is not accounted for in $G_{det}$; and determining for each said point in time a shear wave reflectivity component in accordance with the following:

$$R_S = -[Q - [G_{det} + \delta G + 2T^2n - \tfrac{1}{2}]p]8T^2$$

with $P = R_{po}$ and $$Q = GR_{po} - 8T^2R_{so} + (2T^2 - \tfrac{1}{2})\Delta\rho/\rho$$

where,
$R_{po}$ = normal incident compressional wave reflection coefficient
$R_{so}$ = normal incident shear wave reflection coefficient
T = average $V_s/V_p$,
$\rho$ = density
$\delta G$ = totality of amplitude effects caused by said known factors which influence variations in the amplitudes of the acoustic waves with offset,
$\theta$ = incident angle of a gathered trace, and
$A(\theta)$ = a measured amplitude value for a trace of incident angle $\theta$,
so that the influence of said known factors on said measured acoustic waves are removed in determining shear wave reflection information.

4. The method of claim 3 wherein the step of determining incident angles of said gathered traces from said offsets and said smoothed interval velocity functions is calculated according to the equation:

$$\sin^2\theta = \frac{\alpha_2}{V^2}\left[\frac{2(X)^2}{(2X)^2 = 4V^2t^2}\right],$$

where,
$\theta$ = incident angle of a gathered trace,
t = time of reflection,
V = smoothed interval velocity,
X = offset value of a gathered trace, and
$\alpha$ = compressional wave velocity.

5. The method recited in claim 3, wherein the value $\delta G$ is determined in accordance with the relationship:

$$\delta G \approx \frac{<PQ>}{<p2>} + 8T^2S - \frac{(2T^2 - 1/2)}{n} - G_{det}$$

where $<PQ>$ represents filtered values of PQ and $<P^2>$ represents a filtered value of $P^2$, and S represents $R_{po}R_{so}/R_{po}^2$.

6. The method of claim 5 wherein the step of determining incident angles of said gathered traces from said offsets and said smoothed interval velocity functions is calculated according to the equation:

$$\sin^2\theta = \frac{\alpha_2}{V^2}\left[\frac{2(X)^2}{(2X)^2 = 4V^2t^2}\right],$$

where,
$\theta$ = incident angle of a gathered trace,
t = time of reflection,
V = smoothed interval velocity,
X = offset value of a gathered trace, and
$\alpha$ = compressional wave velocity.

* * * * *

UNITED STATES PATENT AND TRADEMARK OFFICE
CERTIFICATE OF CORRECTION

PATENT NO. : 4,858,201
DATED : August 15, 1989
INVENTOR(S) : Neal R. Goins, Ray Steven Spratt It is certified that error appears in the above-identified patent and that said Letters Patent is hereby corrected as shown below:

Col. 3, line 29, "derved" should be -- derived --

Col. 4, line 66, "As known in" should be -- as shown in --

Col. 5, line 29, "$-\rho$" should be -- $-\rho'$ --

Col. 6, line 26, "G = N$\Sigma$igi" should be -- $G = \sum_i^N g_i$ --

Col. 7, line 60, Middle of equation (15) should read $\dfrac{R'_{po} R'_{so}}{R'_{po}{}^2}$ Col. 8, line 21, After "(smoothed" add -- ) --

Col. 9, lines 6-7, "P' is the first time derivative of P." should begin at the left margin of the next line.

Col. 11, line 61, In equation (31), "/V$^3$$_{INT}$" should read -- /V$_{INT}{}^3$ --

Col. 11, line 65, Missing -- $\int$ -- in equation (32)

Col. 11, line 65, In equation (32), "/V$^3$$_{INT}$" should read -- /V$_{INT}{}^3$ --

Col. 12, line 59, Missing -- $\int$ -- in equation (37)

UNITED STATES PATENT AND TRADEMARK OFFICE
CERTIFICATE OF CORRECTION

PATENT NO. : 4,858,201

DATED : August 15, 1989

INVENTOR(S) : Neal R. Goins, Ray Steven Spratt

It is certified that error appears in the above-identified patent and that said Letters Patent is hereby corrected as shown below:

Col. 12, line 64, Missing -- $\int$ -- in equation (38)

Col. 12, line 64, Beginning of equation (38) "$t_{i+1} V2_{i+1}$" should read -- $t_{i+1} V_{i+1}^2$ --

Col. 13, line 1, Beginning of equation (39) "$t_{i+1} V2_{i+1}$" should read -- $t_{i+1} V_{i+1}^2$ --

Col. 13, line 1, Missing -- $\int$ -- in equation (39)

Col. 13, line 10, should read -- $t_{i+1}V_{i+1}^2 + t_i V_i^2 = 0$ --

Col. 13, line 28, Whole line is missing. Add -- $P = \sin\theta_i/\alpha_i = \sin\theta_0/\alpha_0$ --

Col. 13, line 30, should read -- $V^{(n)} = (1/t) \int_0^t \alpha n(t') \, dt'$ --

Col. 13, lines 42-43, Missing -- $\int$ -- in equation (42) in two places

Col. 14, line 38, "sehsmic" should be -- seismic --

Col. 15, line 34, "a step" should be -- at step --

Col. 16, line 21, "sign $R_p$" should be -- sgn $R_p$ --

Col. 16, line 31, "sign $R_p$" should be -- sgn $R_p$ --

Col. 16, line 18, "sign $R_p$" should be -- sgn $R_p$ --

UNITED STATES PATENT AND TRADEMARK OFFICE
CERTIFICATE OF CORRECTION

PATENT NO. : 4,858,201
DATED : August 15, 1989
INVENTOR(S) : Neal R. Goins, Ray Steven Spratt It is certified that error appears in the above-identified patent and that said Letters Patent is hereby corrected as shown below:

Col. 16, line 35, "sign $R_p$" should be -- sgn $R_p$ --

Col. 16, line 41, "sign $R_p$" should be -- sgn $R_p$ --

Col. 16, line 47, "were" should be -- wave --

Col. 17, line 18, claim 1, 2nd last paragraph, line 2, "offset" should be -- offsets --

Signed and Sealed this

Twenty-fifth Day of June, 1991

Attest:

HARRY F. MANBECK, JR.

*Attesting Officer*   *Commissioner of Patents and Trademarks*